(12) United States Patent
Mega et al.

(10) Patent No.: US 10,808,833 B2
(45) Date of Patent: Oct. 20, 2020

(54) SHIFT DEVICE

(71) Applicant: KABUSHIKI KAISHA TOKAI-RIKA-DENKI-SEISAKUSHO, Aichi (JP)

(72) Inventors: Susumu Mega, Aichi (JP); Yoshihisa Hirano, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 197 days.

(21) Appl. No.: 15/505,491

(22) PCT Filed: Aug. 7, 2015

(86) PCT No.: PCT/JP2015/072567
§ 371 (c)(1),
(2) Date: Feb. 21, 2017

(87) PCT Pub. No.: WO2016/042942
PCT Pub. Date: Mar. 24, 2016

(65) Prior Publication Data
US 2017/0261098 A1   Sep. 14, 2017

(30) Foreign Application Priority Data
Sep. 17, 2014   (JP) ................................. 2014-188806

(51) Int. Cl.
*F16H 59/10*   (2006.01)
*B60K 20/06*   (2006.01)
(Continued)

(52) U.S. Cl.
CPC ............. *F16H 59/10* (2013.01); *B60K 20/06* (2013.01); *F16H 61/22* (2013.01); *G05G 1/00* (2013.01); *F16H 2059/0295* (2013.01)

(58) Field of Classification Search
CPC .......... F16H 59/10; F16H 61/22; B60K 20/06; G05G 1/00
See application file for complete search history.

(56) References Cited

U.S. PATENT DOCUMENTS 2,964,964 A * 12/1960 Craig ...................... F16H 59/10
74/473.33
3,795,157 A * 3/1974 Campbell ............... F16H 59/06
477/165
(Continued)

FOREIGN PATENT DOCUMENTS

EP   0582505 A1   2/1994
JP   2001-080380 A   3/2001
(Continued)

OTHER PUBLICATIONS

International Search Report issued in a corresponding application PCT/JP2015/072567 dated Nov. 2, 2015.
(Continued)

*Primary Examiner* — Zakaria Elahmadi
(74) *Attorney, Agent, or Firm* — Roberts Calderon Safran & Cole P.C.

(57) ABSTRACT

In a shift device, when a switch is operated, a moving portion, a first lock plate, a second lock plate and a third lock plate are moved toward a vehicle front side, and placement of the first lock plate, the second lock plate and the third lock plate at a return path is cancelled. Therefore, if the switch is operated when a lever is placed at other than a "P" position, due to a guide pin being moved along the return path toward an upper side by urging force of a return spring, the guide pin is returned to a vehicle front side end of a first lateral path, and the lever is returned to the "P" position. Due thereto, the lever can easily return to the "P" position from other than the "P" position.

9 Claims, 9 Drawing Sheets (51) Int. Cl.
 *G05G 1/00* (2006.01)
 *F16H 61/22* (2006.01)
 *F16H 59/02* (2006.01)

(56) References Cited

U.S. PATENT DOCUMENTS

| | | | | |
|---|---|---|---|---|
| 5,099,720 | A * | 3/1992 | Raue | F16H 61/0213 200/61.27 |
| 5,156,243 | A * | 10/1992 | Aoki | B60K 20/06 192/218 |
| 5,184,523 | A * | 2/1993 | Nyzedatny | B60K 20/00 74/471 XY |
| 5,220,985 | A * | 6/1993 | Annis | B60T 1/005 192/219.5 |
| 5,442,974 | A * | 8/1995 | Sugimoto | B60K 37/06 74/335 |
| 6,272,944 | B1 * | 8/2001 | Jeong | F16H 59/10 74/473.12 |
| 6,532,842 | B1 * | 3/2003 | Arai | B60K 20/06 74/473.1 |
| 6,834,563 | B2 * | 12/2004 | Seekircher | F16H 59/105 192/220.2 |
| 9,104,225 | B2 * | 8/2015 | Pohanka | B62D 1/04 |
| 2004/0237693 | A1 * | 12/2004 | Koide | F16H 59/0204 74/473.18 |
| 2009/0107287 | A1 * | 4/2009 | Seki | B60K 37/06 74/504 |

FOREIGN PATENT DOCUMENTS

| | | | |
|---|---|---|---|
| JP | 2001080380 A | * | 3/2001 |
| JP | 2006-168512 A | | 6/2006 |
| JP | 2006-347305 A | | 12/2006 |
| JP | 2007-326549 A | | 12/2007 |
| JP | 2010-228643 A | | 10/2010 |

OTHER PUBLICATIONS

Extended European Search Report issued in a corresponding EP application 15842921.7 dated May 15, 2018.

* cited by examiner

SHIFT DEVICE

CROSS-REFERENCE TO RELATED APPLICATIONS

The present application is a U.S. National Phase of PCT/JP2015/072567 filed on Aug. 7, 2015 claiming priority to Japanese Patent application No. 2014-188806 filed Sep. 17, 2014. The disclosure of the PCT Application is hereby incorporated by reference into the present Application.

TECHNICAL FIELD

The present invention relates to a shift device at which a shift position is changed by a shift body being moved.

BACKGROUND ART

In the shift device disclosed in Japanese Patent Application Laid-Open (JP-A) No. 2006-347305, a shift lever is moved from the neutral position toward the vehicle front side and the vehicle right side, and is placed at the reverse position. Further, due to a parking switch being operated, the shift lever is returned from the reverse position to the neutral position.

Here, in this shift device, the shift lever is moved toward the vehicle left side and the vehicle rear side when the shift lever is returned from the reverse position to the neutral position.

SUMMARY OF INVENTION

Technical Problem

In view of the above-described circumstances, an object of the present invention is to provide a shift device that can make it possible to facilitate the returning of a shift body from a second shift position to a first shift position.

Solution to Problem

A shift device of a first aspect of the present invention comprises: a shift body that is movable; a first movement path along which the shift body is moved in a plurality of directions and placed from a first shift position to a second shift position; and a second movement path along which, at a predetermined occasion, the shift body is moved and returned from the second shift position to the first shift position.

In a shift device of a second aspect of the present invention, in the shift device of the first aspect of the present invention, the shift body is moved along the second movement path, and a shift position is changed.

In a shift device of a third aspect of the present invention, in the shift device of the first aspect or the second aspect of the present invention, at a predetermined occasion, the shift body is moved along the second movement path and is returned from the second shift position via a third shift position to the first shift position, and, due to the shift body being moved along the first movement path, the shift body is placed at the third shift position.

A shift device of a fourth aspect of the present invention comprises, in the shift device of any one of the first aspect through the third aspect of the present invention, a return portion that, due to the return portion being operated, the shift body is moved along the second movement path and is returned from the second shift position to the first shift position.

Advantageous Effects of Invention

In the shift device of the first aspect of the present invention, the shift body is moved along the first movement path in plural directions, and is placed from the first shift position to the second shift position.

Here, at a predetermined occasion, the shift body is moved along the second movement path, and is returned from the second shift position to the first shift position. Therefore, returning of the shift body from the second shift position to the first shift position can be facilitated.

In the shift device of the second aspect of the present invention, the shift body is moved along the second movement path, and the shift position is changed. Therefore, changing of the shift position of the shift body can be facilitated.

In the shift device of the third aspect of the present invention, at a predetermined occasion, the shift body is moved along the second movement path, and is returned from the second shift position via the third shift position to the first shift position. Moreover, the shift body is moved along the first movement path, and is placed at the third shift position. Therefore, if the shift body is moved along the first movement path and is placed at the third shift position, the shift body can be returned from the third shift position to the first shift position.

In the shift device of the fourth aspect of the present invention, due to the return portion being operated, the shift body is moved along the second movement path, and is returned from the second shift position to the first shift position. Therefore, the shift body can be returned to the first shift position when needed.

DESCRIPTION OF EMBODIMENTS

Figure 1:
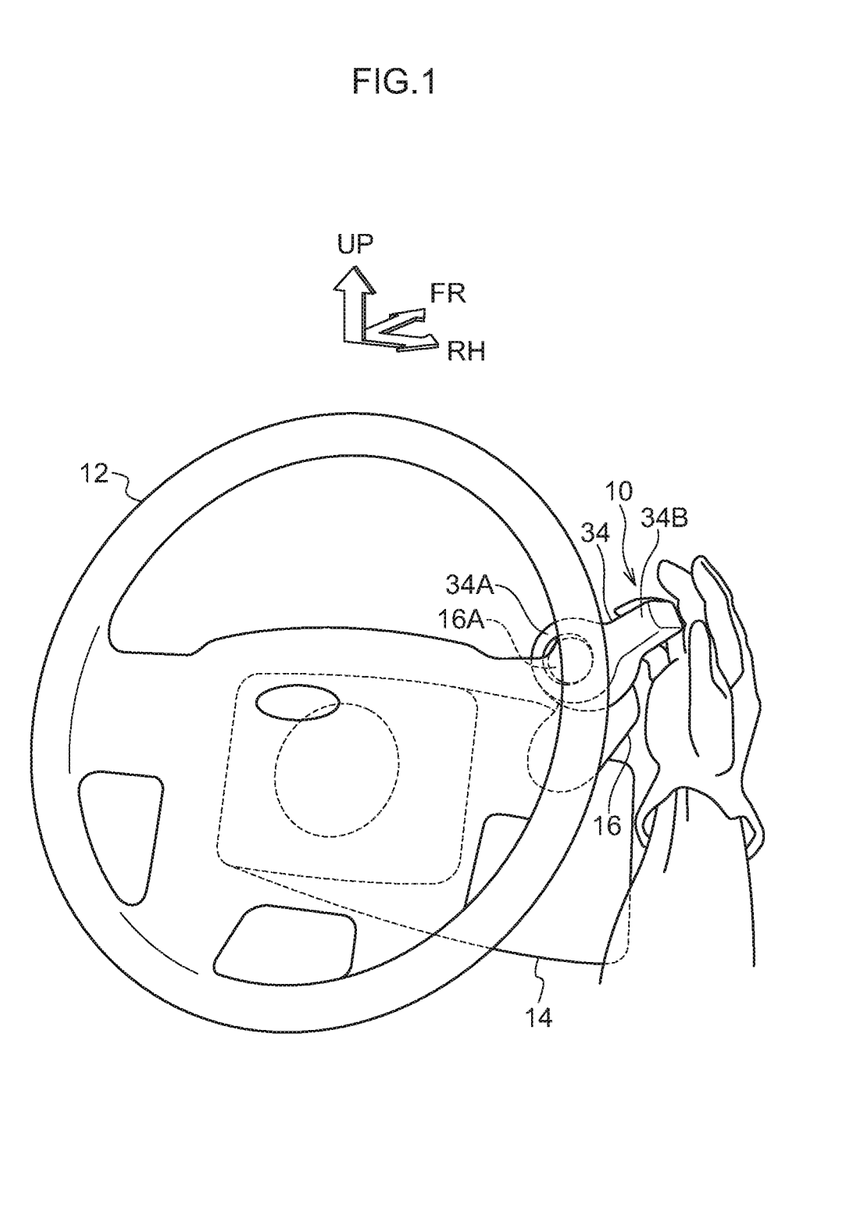
FIG. 1 is a perspective view that is seen from a vehicle obliquely right and rear side and shows a set portion, that is set at a vehicle, of a shift device relating to an embodiment of the present invention.
Figure 2:
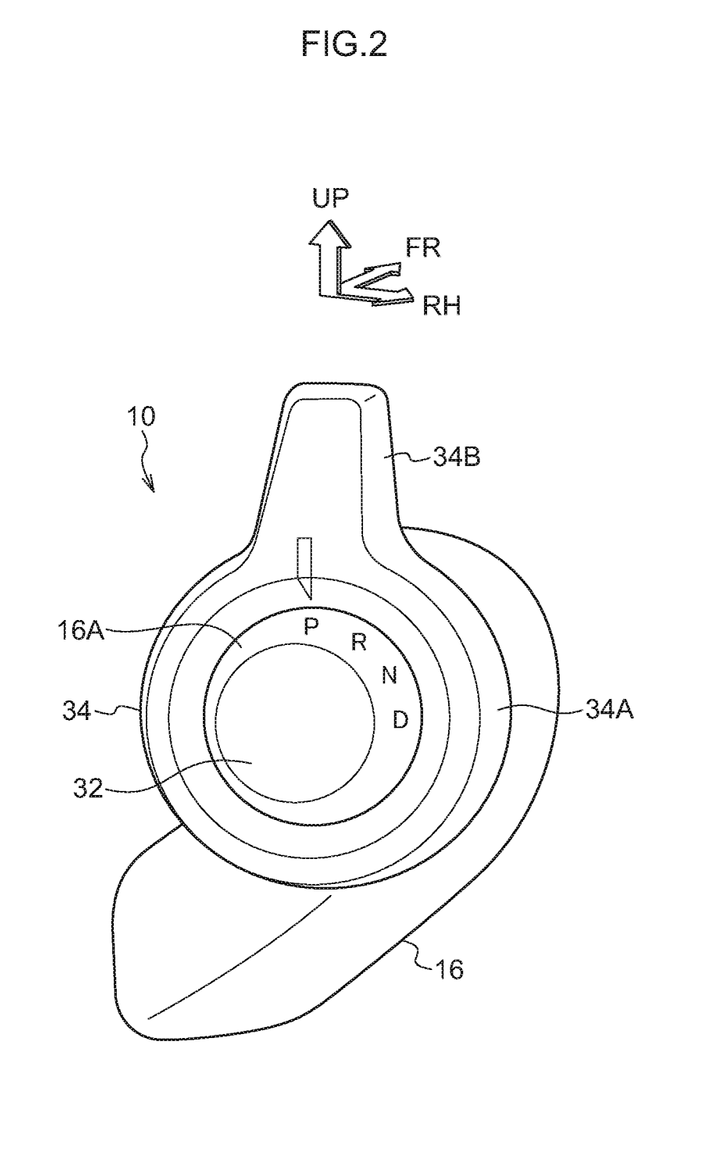
FIG. 2 is a perspective view that is seen from a vehicle obliquely right and rear side and shows a state in which a lever of the shift device relating to the embodiment of the present invention is placed at a "P" position.

A set portion, that is set at a vehicle, of a shift device 10 relating to an embodiment of the present invention is shown in FIG. 1 in a perspective view that is seen from a vehicle obliquely right and rear side. Note that, in the drawings, the vehicle front side is indicated by arrow FR, the vehicle right side is indicated by arrow RH, and the upper side is indicated by arrow UP.

As shown in FIG. 1, the shift device 10 relating to the present embodiment is a so-called by wire type and column-type shift device, and is disposed at the vehicle front side of the driver's seat (not illustrated) of the vehicle (automobile). A steering wheel 12 is disposed at the vehicle front side of the driver's seat. The steering wheel 12 is fixed coaxially to a steering shaft (not illustrated), and the passenger who is seated in the driver's seat (the driver) can rotatingly operate the steering wheel 12. A column cover 14 that is substantially rectangular tube-shaped is disposed at the periphery of the steering shaft at the vehicle front side of the steering wheel 12. The steering shaft is covered by the column cover 14.

The shift device 10 is set at the vehicle upper right portion of the column cover 14.

As shown in FIG. 2 through FIG. 5 as well, a supporting body 16 that is substantially shaped as a bent cylinder is provided at the shift device 10. The base end of the supporting body 16 is fixed to the upper end portion of the vehicle right side surface of the column cover 14. The base end side portion of the supporting body 16 extends in a direction heading upward while heading toward the vehicle right side, and the distal end side portion of the supporting body 16 extends toward the vehicle rear side.

A shaft body 16A that is substantially spherical is provided at the distal end portion (the vehicle rear side end portion) of the supporting body 16. The axis of the shaft body 16A is disposed horizontally in the vehicle longitudinal direction.

Figure 6:
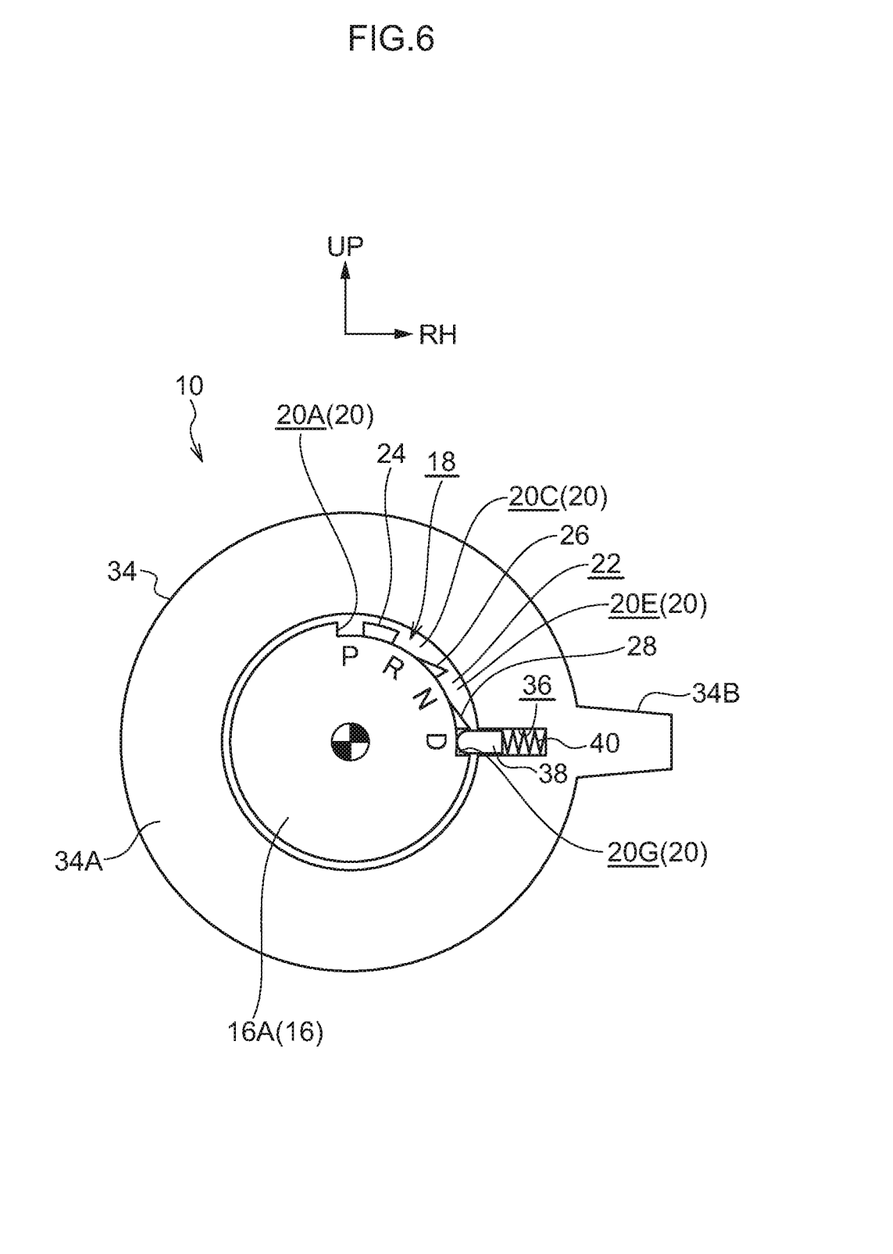
FIG. 6 is a cross-sectional view that is seen from the vehicle rear side and shows the shift device relating to the embodiment of the present invention.
Figure 7:
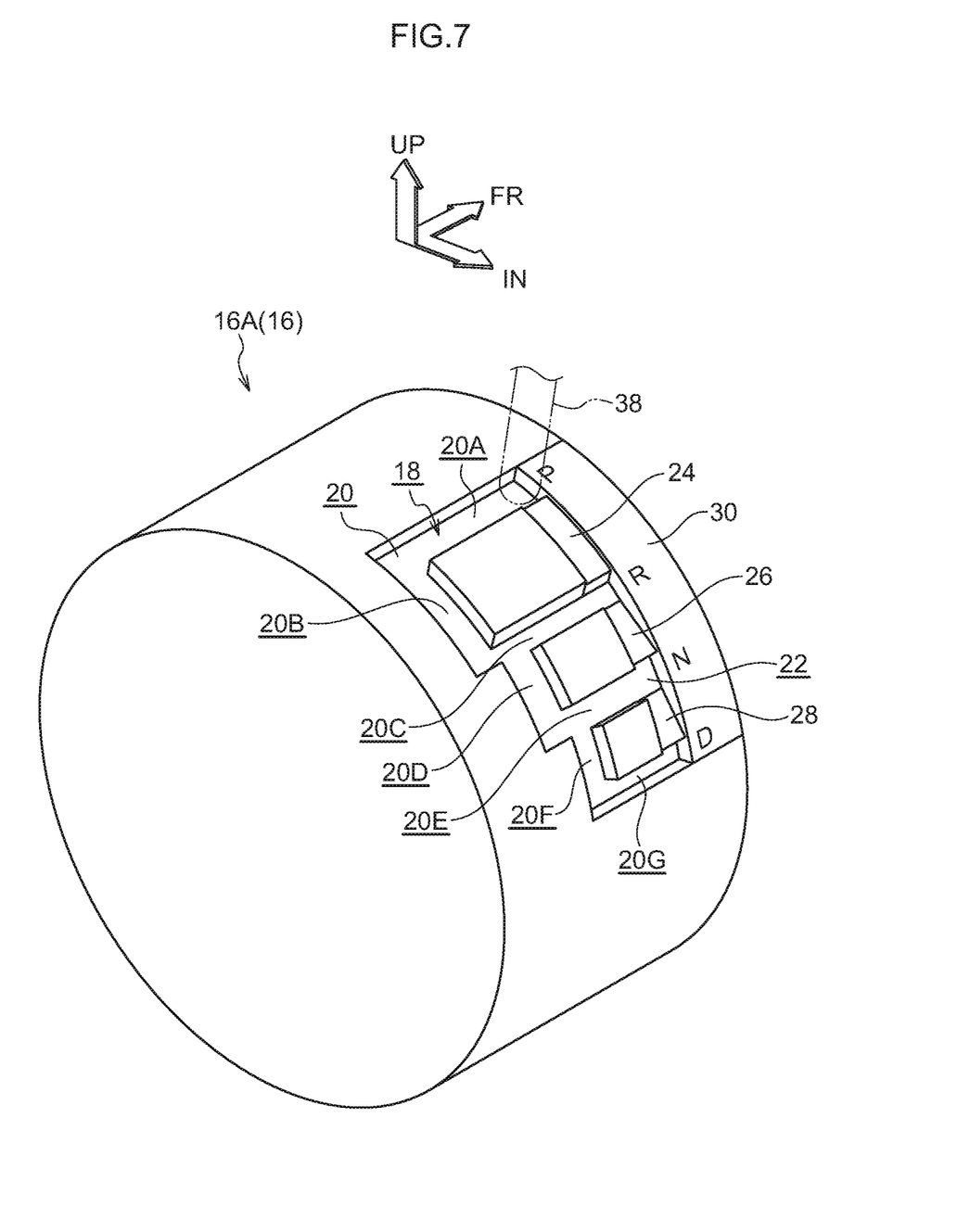
FIG. 7 is a perspective view that is seen from a vehicle obliquely right and rear side and shows a shaft body of the shift device relating to the embodiment of the present invention.
Figure 8:
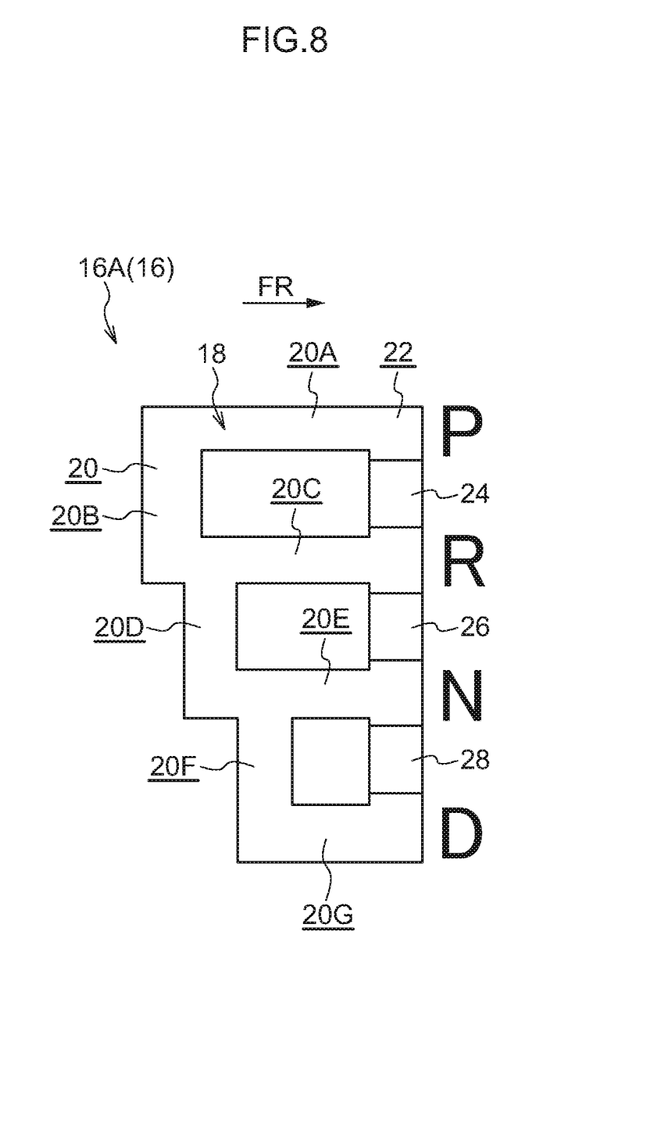
FIG. 8 is an elevation that shows a guide path of the shift device relating to the embodiment of the present invention.

As shown in FIG. 6 through FIG. 8, a guide path 18 that is shaped as a groove is formed in the vehicle upper right side surface of the shaft body 16A. A bent path 20 that serves as a first movement path is provided at the guide path 18. A first lateral path 20A is provided at the upper end of the bent path 20, and the first lateral path 20A extends in the vehicle longitudinal direction. A first lengthwise path 20B is provided at the lower side of the vehicle rear side end of the first lateral path 20A, and the first lengthwise path 20B extends around the axis of the shaft body 16A. A second lateral path 20C is provided at the vehicle front side of the lower end of the first lengthwise path 20B, and the second lateral path 20C extends in the vehicle longitudinal direction. A second lengthwise path 20D is provided at the lower side of the vehicle rear side end of the second lateral path 20C, and the second lengthwise path 20D extends around the axis of the shaft body 16A. A third lateral path 20E is provided at the vehicle front side of the lower end of the second lengthwise path 20D, and the third lateral path 20E extends in the vehicle longitudinal direction. A third lengthwise path 20F is provided at the lower side of the vehicle rear side end of the third lateral path 20E, and the third lengthwise path 20F extends around the axis of the shaft body 16A. A fourth lateral path 20G is provided at the vehicle front side of the lower end of the third lengthwise path 20F, and the fourth lateral path 20G extends in the vehicle longitudinal direction.

A return path 22 that serves as a second movement path is provided at the guide path 18. The return path 22 extends around the axis of the shaft body 16A. The return path 22 passes from the vehicle front side end of the first lateral path 20A past the vehicle front side end of the second lateral path 20C and the vehicle front side end of the third lateral path 20E, and reaches the vehicle front side end of the fourth lateral path 20G.

A first lock plate 24 that serves as a locking portion is disposed at the return path 22 between the vehicle front side end of the first lateral path 20A and the vehicle front side end of the second lateral path 20C. The cross-section, that is perpendicular to the vehicle longitudinal direction, of the first lock plate 24 is substantially rectangular, and the upper end surface and the lower end surface of the first lock plate 24 are disposed perpendicular to the direction around the axis of the shaft body 16A. A second lock plate 26 that serves as a permitting/locking portion is disposed at the return path 22 between the vehicle front side end of the second lateral path 20C and the vehicle front side end of the third lateral path 20E. The cross-section, that is perpendicular to the vehicle longitudinal direction, of the second lock plate 26 is substantially triangular. The upper end surface of the second lock plate 26 is inclined in a direction of heading toward the radial direction outer side of the shaft body 16A while heading toward the lower side, and the lower end surface of the second lock plate 26 is disposed perpendicular to the direction around the axis of the shaft body 16A. A third lock plate 28 serving as a permitting/locking portion is disposed at the return path 22 between the vehicle front side end of the third lateral path 20E and the vehicle front side end of the fourth lateral path 20G. The cross-section, that is perpendicular to the vehicle longitudinal direction, of the third lock plate 28 is substantially triangular. The upper side surface of the third lock plate 28 is inclined in a direction of heading toward the radial direction outer side of the shaft body 16A while heading toward the lower side, and the lower end surface of the third lock plate 28 is disposed perpendicular to the direction around the axis of the shaft body 16A.

A moving portion 30 that is shaped as a curved plate is provided at the shaft body 16A at the vehicle front side of the guide path 18. The first lock plate 24, the second lock plate 26 and the third lock plate 28 are made integral with the moving portion 30.

A switch 32 (refer to FIG. 2 through FIG. 5), that is circular in a front view and that serves as a return portion, is provided at the vehicle rear side end portion of the shaft body 16A. The switch 32 can be press-operated toward the vehicle front side. The switch 32 is mechanically connected to the moving portion 30 of the shaft body 16A. When the switch 32 is push-operated toward the vehicle front side, the moving portion 30, the first lock plate 24, the second lock plate 26 and the third lock plate 28 are moved toward the vehicle front side integrally with the switch 32, and the placement of the first lock plate 24, the second lock plate 26 and the third lock plate 28 at the return path 22 is cancelled. The switch 32 is urged toward the vehicle rear side. When the pushing operation of the switch 32 toward the vehicle front side is cancelled, due to the switch 32 being moved toward the vehicle rear side by urging force, the moving portion 30, the first lock plate 24, the second lock plate 26 and the third lock plate 28 are moved toward the vehicle rear side integrally with the switch 32, and the first lock plate 24, the second lock plate 26 and the third lock plate 28 are placed on the return path 22.

The switch 32 is an engine start/stop switch, and the switch 32 is electrically connected to the engine (not shown) of the vehicle. The engine is started-up when the switch 32 is push-operated toward the vehicle front side in the state in which the engine is stopped. On the other hand, the engine is stopped when the switch 32 is pushed-operated toward the vehicle front side in the state in which the engine is driven.

As shown in FIG. 2 through FIG. 6, a lever 34 that serves as a shift body is supported at the shaft body 16A. A main body portion 34A that is substantially cylindrical tube-shaped is provided at the lever 34. The lever 34 is rotatably supported at the shaft body 16A due to the shaft body 16A being substantially fit-together with the interior of the main body portion 34A.

An insert hole 36 that is cylindrical is formed in the main body portion 34A. The axial direction of the insert hole 36 is disposed parallel to the radial direction of the main body portion 34A, and the insert hole 36 opens to the interior of the main body portion 34A. A guide pin 38 that is substantially cylindrical and serves as a guiding member is fit-in the insert hole 36. The distal end portion of the guide pin 38 is hemispherical. A guide spring 40 (a compression coil spring) that serves as an urging means is bridge between the bottom surface of the insert hole 36 and the base end surface of the guide pin 38. The guide pin 38 is urged toward the radial direction inner side of the main body portion 34A by the guide spring 40, and the distal end portion of the guide pin 38 is inserted in the guide path 18 of the shaft body 16A. Therefore, rotation of the lever 34 is permitted due to the guide pin 38 being moved (guided) along the guide path 18.

An operation portion 34B, that is substantially rectangular column-shaped, is provided integrally with the outer peripheral surface of the main body portion 34A at the portion thereof that is at the guide pin 38 side. The operation portion 34B extends out toward the radial direction outer side of the main body portion 34A. The operation portion 34B can be operated by a passenger. The lever 34 is rotated due to the operation portion 34B being operated. Further, due to the guide pin 38 being moved along the first lengthwise path 20B, the second lengthwise path 20D, the third lengthwise path 20F of the bent path 20 and the return path 22 of the guide path 18 (refer to FIG. 7 and FIG. 8), movement of the operation portion 34B in the substantially vertical direction (the direction around the axis of the shaft body 16A, the shifting direction) is permitted. Moreover, due to the guide pin 38 being moved along the first lateral path 20A, the second lateral path 20C, the third lateral path 20E and the fourth lateral path 20G of the bent path 20, movement of the operation portion 34B in the vehicle longitudinal direction (the selecting direction) is permitted.

When the lever 34 is rotated and the guide pin 38 is placed at the vehicle front side end of the first lateral path 20A, the lever 34 is placed at a "P" position (parking position) that serves as a first shift position. When the lever 34 is rotated and the guide pin 38 is placed at the vehicle front side end of the second lateral path 20C, the lever 34 is placed at an "R" position (reverse position) that serves as a second shift position and a third shift position. When the lever 34 is rotated and the guide pin 38 is placed at the vehicle front side end of the third lateral path 20E, the lever 34 is placed at an "N" position (neutral position) that serves as the second shift position and the third shift position. When the lever 34 is rotated and the guide pin 38 is placed at the vehicle front side end of the fourth lateral path 20G, the lever 34 is placed at a "D" position (drive position) that serves as the second shift position.

The lever 34 is electrically connected to the automatic transmission of the vehicle, and the shift range of the automatic transmission is changed due to the shift position of the lever 34 being changed.

Figure 5:
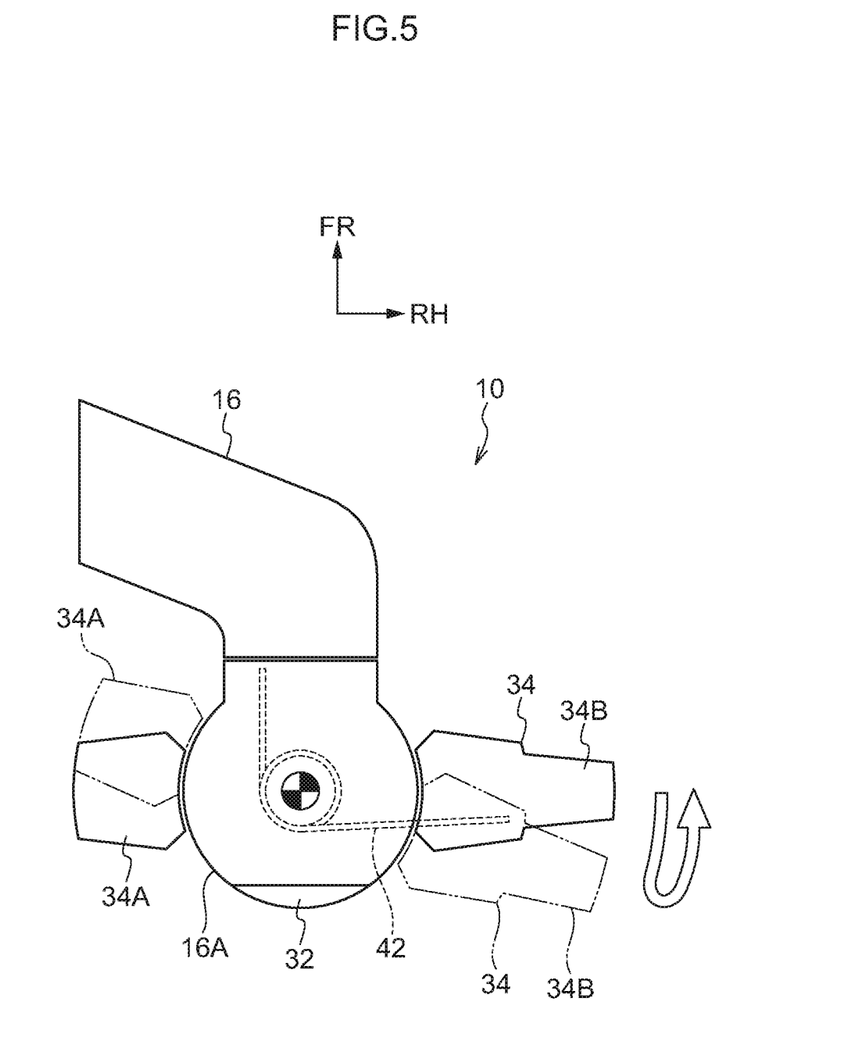
FIG. 5 is a cross-sectional view that is seen from the upper side (a cross-sectional view along line 5-5 of FIG. 4) that shows the shift device relating to the embodiment of the present invention.

As shown in FIG. 5, a placement spring 42 (a torsion coil spring) that serves as a placing means is bridged between the lever 34 and the shaft body 16A. The placement spring 42 urges the lever 34 in the direction in which the operation portion 34B moves from the vehicle rear side toward the vehicle front side.

Figure 3:
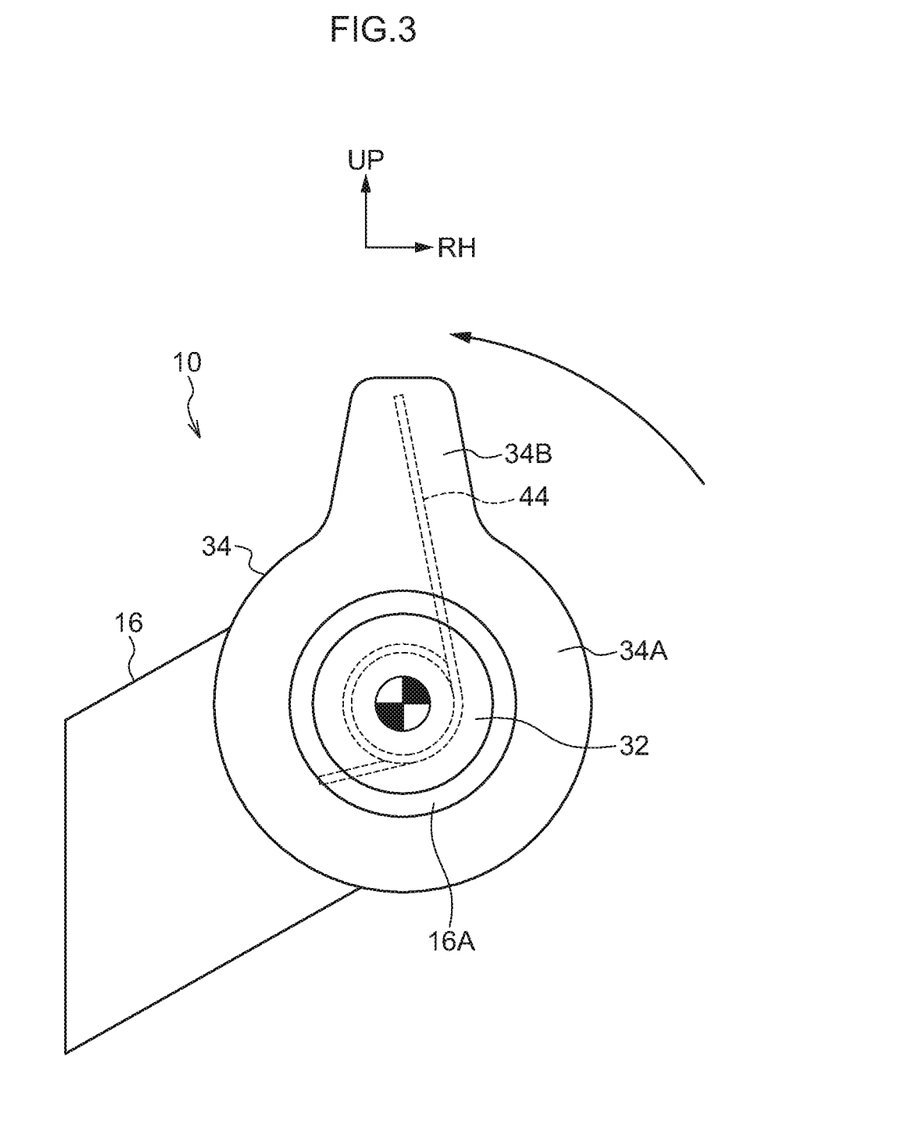
FIG. 3 is an elevation that is seen from the vehicle rear side and shows the shift device relating to the embodiment of the present invention.
Figure 4:
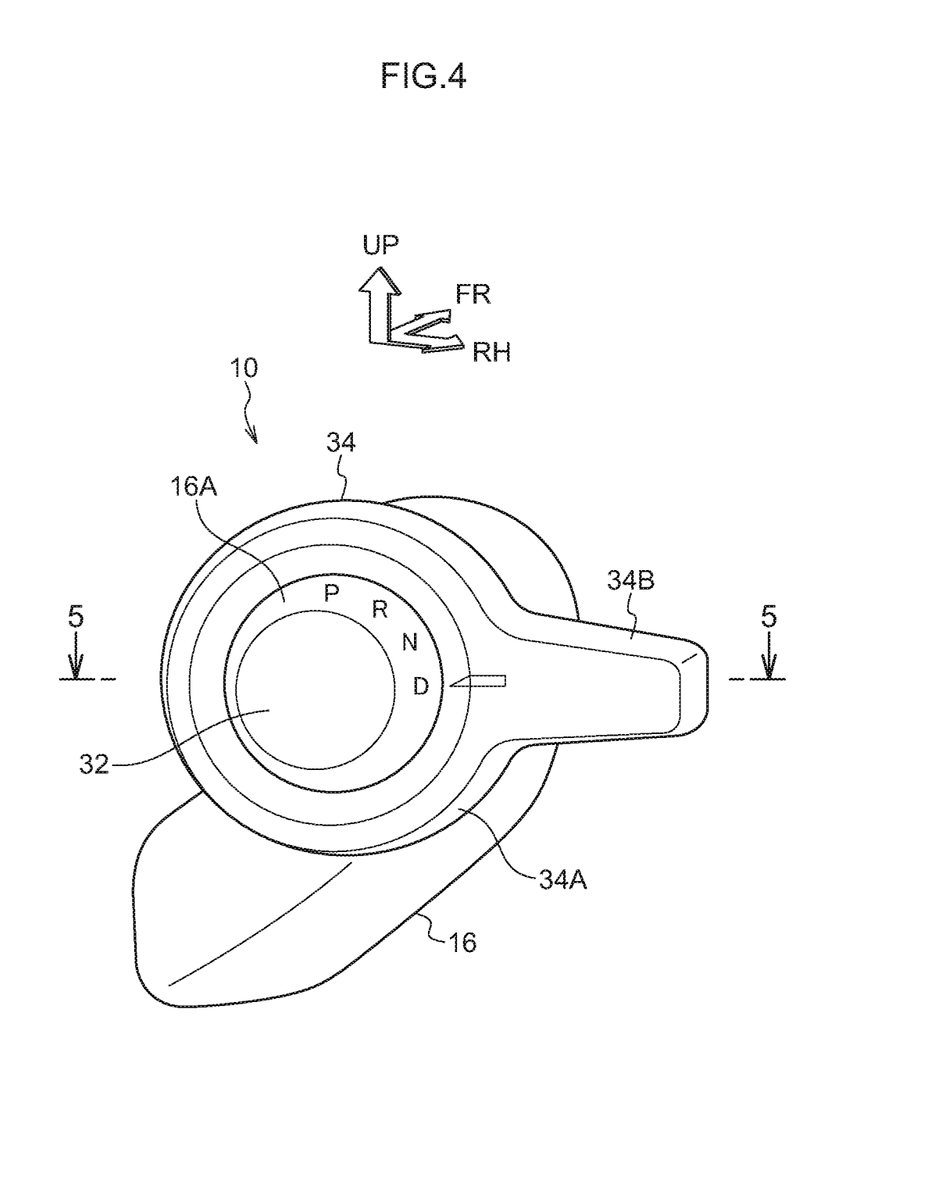
FIG. 4 is a perspective view that is seen from a vehicle obliquely right and rear side and shows a state in which the lever of the shift device relating to the embodiment of the present invention is placed at a "D" position.

As shown in FIG. 3, a return spring 44 (a torsion coil spring) that serves as a returning means is bridged between the lever 34 and the shaft body 16A. The return spring 44 urges the lever 34 in the direction in which the operation portion 34B moves from the lower side toward the upper side.

Operation of the present embodiment is described next.

In the shift device 10 of the above-described structure, when the lever 34 is moved from the "P" position to the "R" position (when the guide pin 38 of the lever 34 is moved from the vehicle front side end of the first lateral path 20A of the bent path 20 at the guide path 18 to the vehicle front side end of the second lateral path 20C of the bent path 20), the guide pin 38 being moved toward the lower side along the return path 22 of the guide path 18 is locked by the upper end surface of the first lock plate 24 of the shaft body 16A. Therefore, after the operation portion 34B of the lever 34 is operated toward the vehicle rear side and the guide pin 38 is moved along the first lateral path 20A toward the vehicle rear side, the operation portion 34B is operated toward the lower side, and the guide pin 38 is moved along the first lengthwise path 20B of the bent path 20 toward the lower side (see FIG. 9). Due thereto, due to the operation portion 34B being moved toward the vehicle front side by the urging force of the placement spring 42 and the guide pin 38 being moved along the second lateral path 20C toward the vehicle front side, the guide pin 38 is moved to the vehicle front side end of the second lateral path 20C, and the lever 34 is moved to the "R" position.

When the lever 34 is moved from the "R" position to the "N" position (when the guide pin 38 is moved from the vehicle front side end of the second lateral path 20C to the vehicle front side end of the third lateral path 20E of the bent path 20), the guide pin 38 being moved toward the lower side along the return path 22 is permitted by the upper side surface (the inclined surface) of the second lock plate 26 of the shaft body 16A. Therefore, due to the operation portion 34B being operated toward the lower side, the guide pin 38 rides-over the second lock plate 26 against the urging force of the guide spring 40, and is moved along the return path 22 toward the lower side (refer to FIG. 9). Due thereto, the guide pin 38 is moved to the vehicle front side end of the third lateral path 20E, and the lever 34 is moved to the "N" position.

Figure 9:
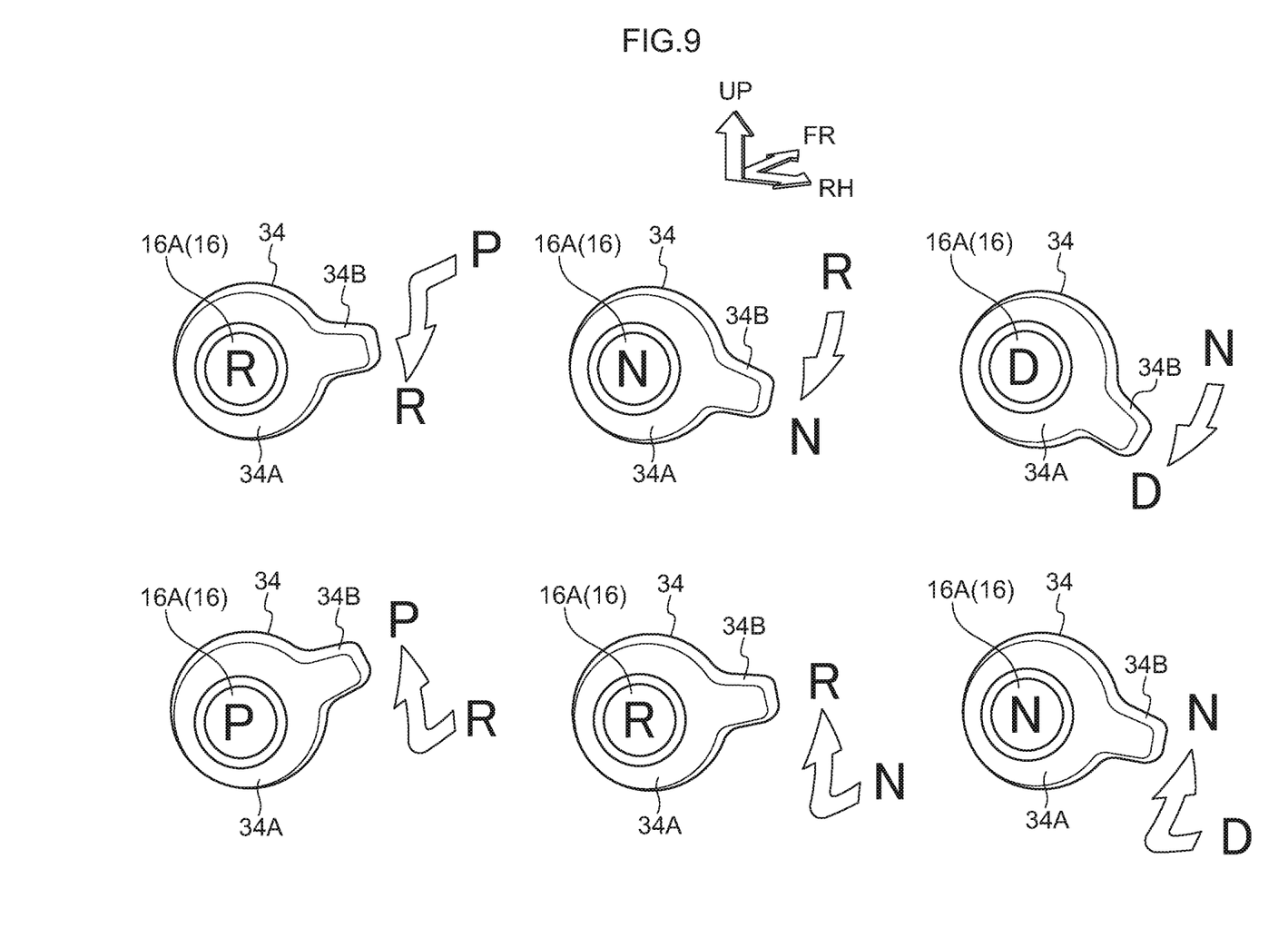
FIG. 9 is perspective views that are seen from a vehicle obliquely right and rear side and show lever operations of the shift device relating to the embodiment of the present invention.

Note that, when the lever 34 is moved from the "R" position to the "N" position, after the operation portion 34B is operated toward the vehicle rear side and the guide pin 38 is moved along the second lateral path 20C toward the vehicle rear side, the operation portion 34B may be operated toward the lower side, and the guide pin 38 may be moved along the second lengthwise path 20D of the bent path 20 toward the lower side. Due thereto, due to the operation portion 34B being moved toward the vehicle front side by the urging force of the placement spring 42 and the guide pin 38 being moved along the third lateral path 20E toward the vehicle front side, the guide pin 38 is moved to the vehicle front side end of the third lateral path 20E, and the lever 34 is moved to the "N" position.

When the lever 34 is moved from the "N" position to the "D" position (when the guide pin 38 is moved from the vehicle front side end of the third lateral path 20E to the vehicle front side end of the fourth lateral path 20G of the bent path 20), the guide pin 38 being moved toward the lower side along the return path 22 is permitted by the upper side surface (the inclined surface) of the third lock plate 28 of the shaft body 16A. Therefore, due to the operation portion 34B being operated toward the lower side, the guide pin 38 rides-over the third lock plate 28 against the urging force of the guide spring 40, and is moved along the return path 22 toward the lower side (see FIG. 9). Due thereto, the guide pin 38 is moved to the vehicle front side end of the fourth lateral path 20G, and the lever 34 is moved to the "D" position.

Note that, when the lever 34 is moved from the "N" position to the "D" position, after the operation portion 34B is operated toward the vehicle rear side and the guide pin 38 is moved along the third lateral path 20E toward the vehicle rear side, the operation portion 34B may be operated toward the lower side, and the guide pin 38 may be moved along the third lengthwise path 20F of the bent path 20 toward the lower side. Due thereto, due to the operation portion 34B being moved toward the vehicle front side by the urging force of the placement spring 42 and the guide pin 38 being moved along the fourth lateral path 20G toward the vehicle front side, the guide pin 38 is moved to the vehicle front side end of the fourth lateral path 20G, and the lever 34 is moved to the "D" position.

When the lever 34 is moved from the "D" position to the "N" position (when the guide pin 38 is moved from the vehicle front side end of the fourth lateral path 20G to the vehicle front side end of the third lateral path 20E), the guide pin 38 being moved along the return path 22 toward the upper side is locked by the lower end surface of the third lock plate 28. Therefore, after the operation portion 34B is operated toward the vehicle rear side and the guide pin 38 is moved along the fourth lateral path 20G toward the vehicle rear side, the operation portion 34B is operated toward the upper side, and the guide pin 38 is moved along the third lengthwise path 20F toward the upper side (refer to FIG. 9). Due thereto, due to the operation portion 34B being moved toward the vehicle front side by the urging force of the placement spring 42 and the guide pin 38 being moved along the third lateral path 20E toward the vehicle front side, the guide pin 38 is moved to the vehicle front side end of the third lateral path 20E, and the lever 34 is moved to the "N" position.

When the lever 34 is moved from the "N" position to the "R" position (when the guide pin 38 is moved from the vehicle front side end of the third lateral path 20E to the vehicle front side end of the second lateral path 20C), the guide pin 38 being moved along the return path 22 toward the upper side is locked by the lower end surface of the second lock plate 26. Therefore, after the operation portion 34B is operated toward the vehicle rear side and the guide pin 38 is moved along the third lateral path 20E toward the vehicle rear side, the operation portion 34B is operated toward the upper side, and the guide pin 38 is moved along the second lengthwise path 20D toward the upper side (refer to FIG. 9). Due thereto, due to the operation portion 34B being moved toward the vehicle front side by the urging force of the placement spring 42 and the guide pin 38 being moved along the second lateral path 20C toward the vehicle front side, the guide pin 38 is moved to the vehicle front side end of the second lateral path 20C, and the lever 34 is moved to the "R" position.

When the lever 34 is moved from the "R" position to the "P" position (when the guide pin 38 is moved from the vehicle front side end of the second lateral path 20C to the vehicle front side end of the first lateral path 20A), the guide pin 38 being moved along the return path 22 toward the upper side is locked by the lower end surface of the first lock plate 24. Therefore, after the operation portion 34B is operated toward the vehicle rear side and the guide pin 38 is moved along the second lateral path 20C toward the vehicle rear side, the operation portion 34B is operated toward the upper side and the guide pin 38 is moved along the first lengthwise path 20B toward the upper side (refer to FIG. 9). Due thereto, due to the operation portion 34B being moved toward the vehicle front side by the urging force of the placement spring 42 and the guide pin 38 being moved along the first lateral path 20A toward the vehicle front side, the guide pin 38 is moved to the vehicle front side end of the first lateral path 20A, and the lever 34 is moved to the "P" position.

Due to the above, in the shift device 10 of the present embodiment, the operation of changing the shift position of the lever 34 can be made to be substantially similar to that of conventional column-type and gate-type shift devices, and changing of the operational feel of the operation of changing the shift position of the lever 34 can be suppressed.

Further, when the switch 32 of the shaft body 16A is push-operated toward the vehicle front side (a predetermined occasion), the moving portion 30, the first lock plate 24, the second lock plate 26 and the third lock plate 28 of the shaft body 16A are moved toward the vehicle front side integrally with the switch 32, and placement of the first lock plate 24, the second lock plate 26 and the third lock plate 28 at the return path 22 is cancelled. Therefore, in a case in which the switch 32 is push-operated toward the vehicle front side when the lever 34 is placed at the "R" position, the "N" position or the "D" position (when the guide pin 38 is placed at the vehicle front side end of the first lateral path 20A, the second lateral path 20C or the third lateral path 20E), due to the operation portion 34B being moved toward the upper side by the urging force of the return spring 44 and the guide pin 38 being moved along the return path 22 toward the upper side, the guide pin 38 is returned to the vehicle front side end of the first lateral path 20A, and the lever 34 is returned to the "P" position.

Here, as described above, when the switch 32 is push-operated toward the vehicle front side, the guide pin 38 is moved along the return path 22, and the lever 34 is returned to the "P" position from the "R" position, the "N" position or the "D" position. Therefore, differently from the case in which the guide pin 38 is moved along the bent path 20 and the lever 34 is returned to the "P" position from the "R" position, the "N" position or the "D" position, the movement path of the guide pin 38 can be made to be short and can be simplified, and the lever 34 can easily return to the "P" position from the "R" position, the "N" position or the "D" position.

Further, as described above, when the lever 34 is moved from the "R" position to the "N" position and when the lever 34 is moved from the "N" position to the "D" position, the guide pin 38 is moved along the return path 22. Therefore, the lever 34 can be moved from the "R" position to the "N" position and from the "N" position to the "D" position, even if the operation portion 34B is not moved in plural directions. Moreover, differently from a conventional straight-type shift device, the lever 34 can be moved from the "R" position to the "N" position and from the "N" position to the "D" position merely by rectilinear movement of the operation portion 34B. Due thereto, the lever 34 can be easily moved from the "R" position to the "N" position and from the "N" position to the "D" position.

Moreover, the bent path 20 and the return path 22 communicate at the vehicle front side end of the second lateral path 20C and the vehicle front side end of the third lateral path 20E. Therefore, due to the guide pin 38 being moved along the bent path 20 and being placed at the vehicle front side end of the second lateral path 20C or the vehicle front side end of the third lateral path 20E, even if the lever 34 is placed at the "R" position or the "N" position, due to the guide pin 38 being moved along the return path 22 at the time when the switch 32 is push-operated toward the vehicle front side, the guide pin 38 can be returned to the vehicle front side end of the first lateral path 20A, and the lever 34 can be returned to the "P" position.

Further, the switch 32 is an engine start/stop switch. Therefore, even if the lever 34 is moved to other than the "P" position in a state in which the engine is stopped, the lever 34 can be returned to the "P" position at the time when the switch 32 is push-operated and the engine is started-up. Moreover, even if the lever 34 is moved to other than the "P" position in the state in which the engine is driven, the lever 34 can be returned to the "P" position at the time when the switch 32 is push-operated and the engine is stopped.

Note that, in the present embodiment, the switch 32 is an engine start/stop switch. However, the switch 32 may be a reset switch. In this case, regardless of the starting-up or stopping or the like of the engine, the lever 34 can be returned to the "P" position when the switch 32 is operated. Moreover, the switch 32 may be a "P" switch (a parking switch). In this case, the lever 34 can be returned to the "P" position at the time when the switch 32 is operated and the automatic transmission is set at the "P" range (parking range).

Further, in the present embodiment, the shift device 10 is a column-type device and is set at the column cover 14. However, the shift device 10 may be set at the floor portion of the vehicle cabin or at the instrument panel.

The disclosure of Japanese Patent Application No. 2014-188806 that was filed on Sep. 17, 2014 is, in its entirety, incorporated by reference into the present specification.

EXPLANATION OF REFERENCE NUMERALS

10 shift device (shift device)
20 bent path (first movement path)
22 return path (second movement path)
32 switch (return portion)
34 lever (shift body)

The invention claimed is:

1. A shift device comprising:
 a shift body that is movable;
 a first movement path along which the shift body is moved in a plurality of directions and placed from a first shift position to a second shift position;
 a second movement path along which, at a predetermined occasion, the shift body is moved in a single direction and returned from the second shift position to the first shift position, and
 a locking plate that locks movement of the shift body in a state in which the locking plate faces a second shift position side of the shift body such that the shift body cannot be moved along the second movement path from the first shift position to the second shift position, that locks movement of the shift body in a state in which the locking plate faces a first shift position side of the shift body such that the shift body cannot be moved along the second movement path from the second shift position to the first shift position, and that, at the predetermined occasion, permits movement of the shift body such that the shift body can be moved along the second movement path from the second shift position to the first shift position.

2. The shift device of claim 1, wherein the shift body is moved along the second movement path, and a shift position is changed.

3. The shift device of claim 1, wherein, at a predetermined occasion, the shift body is moved along the second movement path and is returned from the second shift position via a third shift position to the first shift position, and the shift body is moved along the first movement path and is placed at the third shift position.

4. The shift device of claim 1, comprising a return portion that, due to the return portion being operated, the shift body is moved along the second movement path and is returned from the second shift position to the first shift position.

5. The shift device of claim 1, comprising returning means for urging the shift body in a direction heading from a second shift position side toward a first shift position side.

6. The shift device of claim 1, comprising placing means for urging the shift body in a direction heading from a first movement path side toward a second movement path side.

7. The shift device of claim 1, comprising:
 a guiding member that is provided at the shift body; and
 urging means for urging the guiding member and placing the guiding member at the first movement path or the second movement path.

8. The shift device of claim 1, wherein the shift device is a vehicular shift device, the first shift position is one of N or P, and the second shift position is one of R or D.

9. The shift device of claim 1, wherein the shift device is a vehicular shift device, the first shift position is P, and the second shift position is one of R, N, or D.

* * * * *